United States Patent [19]

Dolland

[11] 4,394,610
[45] Jul. 19, 1983

[54] ADAPTIVE REFERENCE VOLTAGE GENERATOR FOR FIRING ANGLE CONTROL OF LINE-COMMUTATED INVERTERS

[75] Inventor: Carlisle R. Dolland, Torrance, Calif.

[73] Assignee: The United States of America as represented by the Administrator of the National Aeronautics and Space Administration, Washington, D.C.

[21] Appl. No.: 291,131

[22] Filed: Aug. 7, 1981

[51] Int. Cl.³ ............................................. H02P 5/34
[52] U.S. Cl. .................................... 318/803; 318/809; 318/800
[58] Field of Search ................................ 318/722–723, 318/696, 798–801, 805–809

[56] References Cited

U.S. PATENT DOCUMENTS

| | | | |
|---|---|---|---|
| 4,250,435 | 2/1981 | Allet et al. | 318/138 |
| 4,262,236 | 4/1981 | Gelenius et al. | 318/138 |
| 4,264,853 | 4/1981 | Morishita | 318/805 |
| 4,351,022 | 9/1982 | Dolland | 318/803 X |

OTHER PUBLICATIONS

'A Self-Controlled Synchronous Motor Drive Using Terminal Voltage System'; Le-Hoy et al., IEEE Transactions on Industry Applications, vol. IA-18, No. 1, Jan./Feb., 1982.

Primary Examiner—J. V. Truhe
Assistant Examiner—Patrick Keane
Attorney, Agent, or Firm—J. H. Beumer; J. R. Manning; L. D. Wofford, Jr.

[57] ABSTRACT

A control system for a permanent-magnet motor (10) driven by a multiphase line-commutated inverter (12) is provided with integrators (24) for integrating the back EMF of each phase of the motor for use in generating system control signals for an inverter gate logic (30) using a sync and firing angle (α) control generator (26) connected to the outputs of the integrators. A precision full-wave rectifier (16) provides a speed control feedback signal to a phase-delay rectifier (14) via a gain and loop compensation circuit (20) and to the integrators for adaptive control of the attenuation of low frequencies by the integrators as a function of motor speed, whereby as the motor speed increases, the attenuation of low frequency components by the integrators is increased to offset the gain of the integrators to spurious low frequencies. The α-control signals are produced by the firing angle control generator by means (48, 50) for combining 120° segments of the integrated back EMF signals symmetrical about their maxima into composite positive and negative waveforms, and means (45, 46) for sampling the maxima of each waveform every 120°. These samples are then used as positive and negative α-control signals, whereby any change in amplitude of the integrated back EMF signals will not affect a change in the operating power factor of said motor and inverter.

6 Claims, 4 Drawing Figures

ADAPTIVE REFERENCE VOLTAGE GENERATOR FOR FIRING ANGLE CONTROL OF LINE-COMMUTATED INVERTERS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a control system for a permanent-magnet motor drive, and more particularly to motor controllers utilizing the back EMF to obtain information for generating the inverter firing angle.

In some applications, a permanent-magnet (PM) motor is controlled by a line-commutated inverter driven by a dc source comprised of a phase delay rectifier (PDR). The PDR rectifies the 3-phase power from a utility line and delivers the resulting dc current to the inverter over a dc link choke. The dc link choke is designed to provide a smooth current source for the line-commutated inverter. The inverter provides the necessary current to the motor windings.

A motor speed loop is closed around the inverter control, and a change in required speed results in a change in the PDR firing angle. This in turn changes the dc link current, and hence the motor speed. It is possible to vary the current in the dc link from zero to a maximum by adjusting the firing angle of the PDR in response to a gain and loop compensated error signal, where the error is the difference between a speed command signal and a signal proportional to the speed of the motor generated by precision full-wave rectifier of the motor back EMF.

The back EMF is also utilized to generate the inverter control signals. Due to commutation overlap in the inverter, the back EMF is distorted. Consequently, the back EMF must first be filtered to remove distortions. This is generally accomplished with integrators, but in order to maintain a precise firing angle, expensive precision components must be used. A further problem is that the integrators provide much more gain to spurious low frequencies than to the actual operating frequency.

These spurious low-frequency fluctuations are caused by modulation between the PDR ripple and the back EMF frequency. At high motor speeds, these low-frequency fluctuations modulate the motor speed and are further reinforced by the integrators. Thus, in order to operate a line-commutated permanent-magnet motor at high speed, these low-frequency components must be filtered. A single high-pass filter, however, introduces undesirable phase shifts which result in poor motor power factors. The filter break (corner) frequency must be selected such that the phase shift does not cause excessive change in the power factor. It has been found that any single zero location that results in acceptable power factors will not adequately eliminate low-frequency noise at all speeds.

One solution to this filter problem is to provide a high-pass filter whose break frequency can be changed as a function of speed so that adequate low-frequency filtering and system power factors can be obtained at all motor speeds, as disclosed in copending application Ser. No. 291,132 filed Aug. 7, 1981 entitled "ADAPTIVE CONTROL SYSTEM FOR LINE-COMMUTATED INVERTERS." However, as the speed increases, the attenuation of low-frequency components increases. This changes the output amplitude of the filter. Since this output is compared to a constant voltage in generating firing angle signals for inverter firing angle control, any change in amplitude represents a change in the operating power factor of the system.

The dominant factor in the efficiency of a line-commutated inverter is its firing angle. This firing angle always represents a power loss. Consequently, what is required is a system for maintaining precise control of the inverter firing angle, thereby optimizing motor efficiency. From the foregoing, it follows that any such system must be immune to any amplitude fluctuations of the back EMF, or the integrated (filtered) back EMF. An object of this invention is to provide such a system without the use of expensive components in the back EMF integrator.

SUMMARY OF THE INVENTION

In accordance with the present invention, the integrated line-to-neutral waveforms $A\phi$, $B\phi$ and $C\phi$ are compared in pairs to generate square sync waveforms as follows:

$A\phi SYNC = A\phi > B\phi$
$B\phi SYNC = B\phi > C\phi$
$C\phi SYNC = C\phi > A\phi$ The leading edges of these waveforms occur at the time where positive halves of the integrated back EMF waveforms are maximum. By combining these positive half cycles in a "highest wins" circuit, a pulsating waveform is derived that is a train of 120° segments of positive back EMF signals symmetrical about their maxima. Then by utilizing the leading edges of the sync waveforms to time a sample-and-hold circuit, these maxima are sampled and held from one back EMF waveform maximum to the next back EMF waveform maximum. The output of the sample-and-hold circuit supplies the voltage reference used for comparison with RAMP signals derived from the back EMF signals in the following manner:

A RAMP = $C\phi$
B RAMP = $A\phi$
C RAMP = $B\phi$

This reference voltage is thus self-adapted to variations in amplitude of the integrator outputs $A\phi$, $B\phi$ and $C\phi$. It may then be adjusted in amplitude to yield the desired inverter firing angle, $\alpha$. In this mechanization the reference voltage utilized for generating the firing angle varies directly as the amplitude of the ramp signals identified above. Thus the firing angle of the inverter is dependent on the phase of the conditioned back EMF and is independent of its amplitude. Any residual low-frequency component which is not filtered by the high-pass filter in the integrator network is effectively removed. Although the foregoing describes only the generation of a positive $\alpha$-control signal for control of the firing angle of the inverter for positive half cycles, it is evident that the same may be done to generate a negative $\alpha$-control signal for negative half cycles in a strictly analogous manner.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
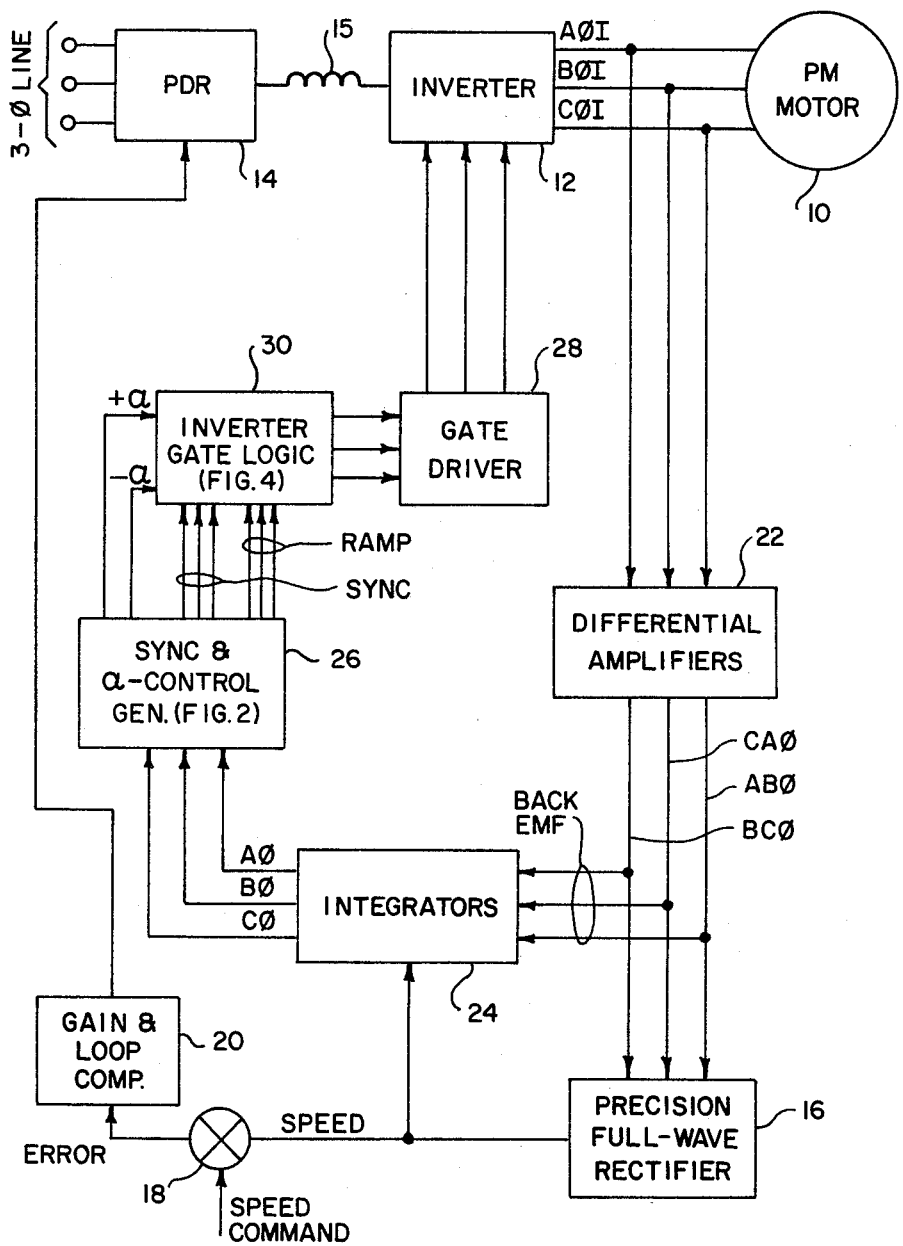
FIG. 1 is a block diagram of a control system for a permanent-magnet motor driven by a line-commutated inverter in which the present invention is utilized.

Referring to FIG. 1 of the drawings, a permanent-magnet (PM) motor 10 is shown controlled by a line-commutated inverter 12 that is powered by a phase delay rectifier (PDR) 14. The latter conditions power from a 3-phase utility line and delivers the resulting dc current to the inverter through a dc link choke 15. While the motor is brought up to about 15% of its maximum speed, the necessary current to the motor windings is synchronized by conventional means (not shown) using rotor position information. Once 15% speed is reached, sufficient back EMF can be sensed on the inverter output lines for use in synchronizing the inverter. These back EMF signals are rectified and combined in a precision full-wave rectifier 16 to provide a dc signal proportional to the motor speed. This speed signal is then compared with a dc speed command signal at a comparator 18 to provide an error signal that is applied to the PDR through a gain and loop compensation circuit 20. In that manner, a motor speed loop is closed around the line-commutated control system for the motor which embodies the invention that will now be described.

The back EMF is also utilized to generate the control signals for the line-commutated inverter 12, but due to commutation overlap, the back EMF is distorted. To obtain constant control sinusoidal waveforms devoid of distortion, and in phase with the motor line-to-neutral voltage, the back EMF signals BCφ, CAφ and ABφ from differential amplifiers 22 are filtered in a set of three integrators represented by a single block 24. The differential amplifiers produce sinusoidal signals that are equal to the differences between the back EMFs A, B and C of the phases indicated in pairs as follows:

$$AB\phi = A - B$$
$$BC\phi = B - C \quad CA\phi = C - A$$

The outputs of these integrators are utilized to obtain information for generating the firing angles for all three phases of the inverter, AφI, BφI and CφI. This information is obtained through a sync and α-control generator 26 which then generates the gate firing pulses for inverter gate drivers 28 through inverter gate logic 30.

The integrators 24 provide higher gain to spurious low frequencies than the actual operating frequency. These spurious low-frequency fluctuations are caused by modulation of the PDR ripple frequency with the back EMF frequency. These low-frequency components at high motor speeds are reinforced by the integrators. Consequently, low-frequency filtering is required. That is accomplished, according to the aforesaid copending application (without introducing undesirable phase shifts, which result in poor power factors for the motor) by adaptive control of the break (corner) frequency of high-pass filters at the inputs of the integrators as a function of speed to decrease gain of the integrators as motor speed increases so that adequate low-frequency filtering and system power factor can be obtained at all motor speeds.

It should be noted that as the motor speed increases, and the gain of the integrators decreases, the outputs of the integrators also change in amplitude. Consequently, the concept of an adaptive filter for the integrators cannot be utilized in a conventional line-commutated inverter since the outputs of the integrators are normally compared to a constant reference voltate for the purpose of generating firing angle control signals so that any change in amplitude represents a change in the operating power factor of the system. Thus, the line-commutated inverter must be made immune to any amplitude fluctuations on the back EMF or the filtered back EMF. One technique for providing such immunity will now be disclosed with reference to FIGS. 2 and 3. Briefly, if the integrated line-to-neutral back EMF waveforms Aφ, Bφ and Cφ are compared in pairs to generate square sync waveforms as shown in FIG. 3 according to the following equations:

$$A\phi SYNC = A\phi > B\phi$$

$$B\phi SYNC = B\phi > C\phi$$

$$C\phi SYNC = C\phi > A\phi$$

The leading edges of these waveforms occur at the time where positive halves of the integrated back EMF waveforms are maximum. These leading edges are detected to generate timing pulses used to sample and hold the peaks of the integrated line-to-neutral back EMF waveforms Aφ, Bφ and Cφ. The sample and hold output is used over the next 120° to generate through a potentiometer the reference voltage with which the integrated line-to-neutral back EMF waveforms are compared in generating the firing angle control signals for the A+, B+ C+ SCR's of the inverter. This reference voltage, referred to hereinafter as the α-control signal, is thus self-adapted to the amplitude of the condition back EMF waveforms out of the integrators. A strictly analogous arrangement is also provided for a negative α-control signal to fire the A-, B- and C- SCR's of the inverter.

Figure 2:
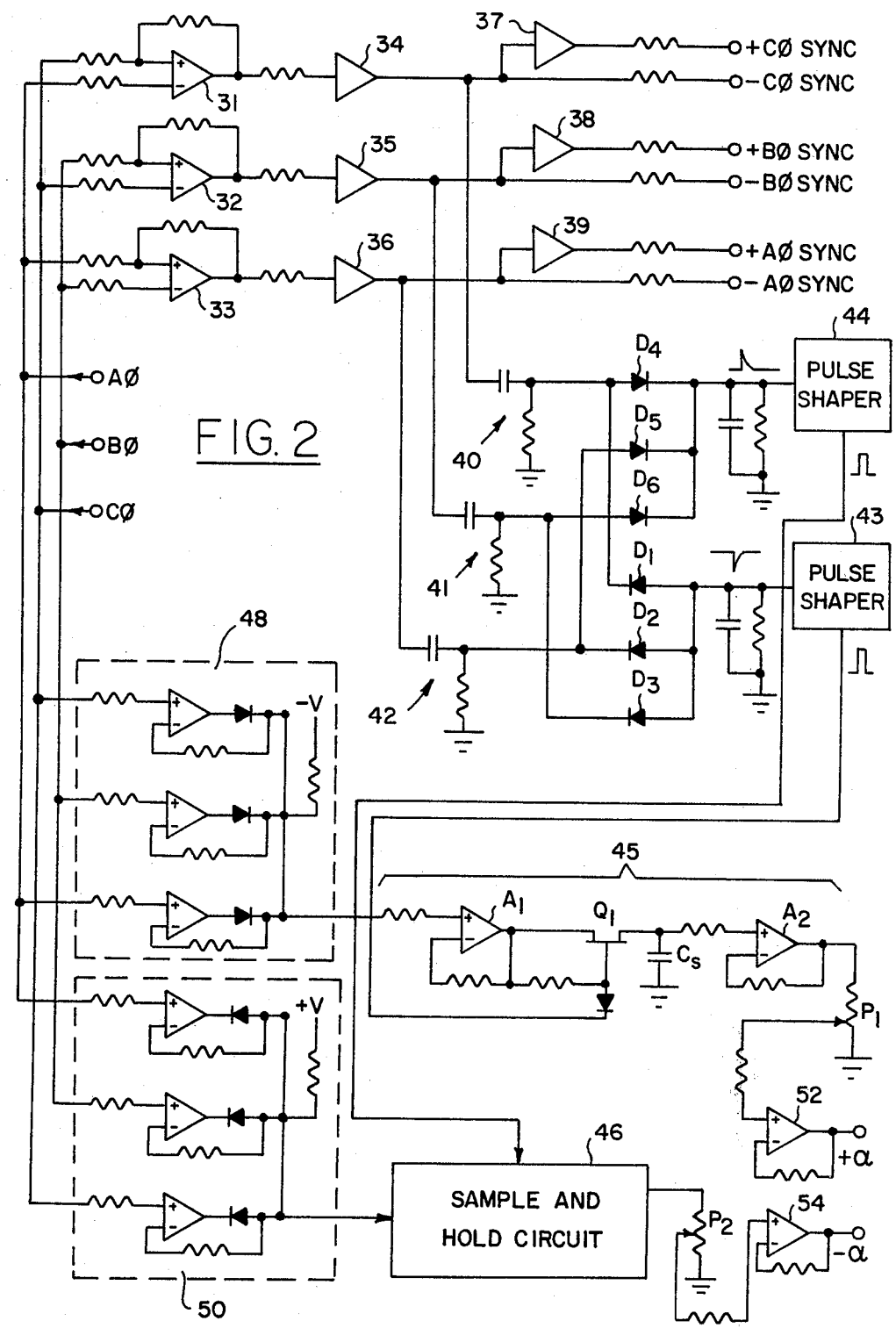
FIG. 2 is a schematic diagram of the sync AND α-control generator in the system of FIG. 1.
Figure 3:
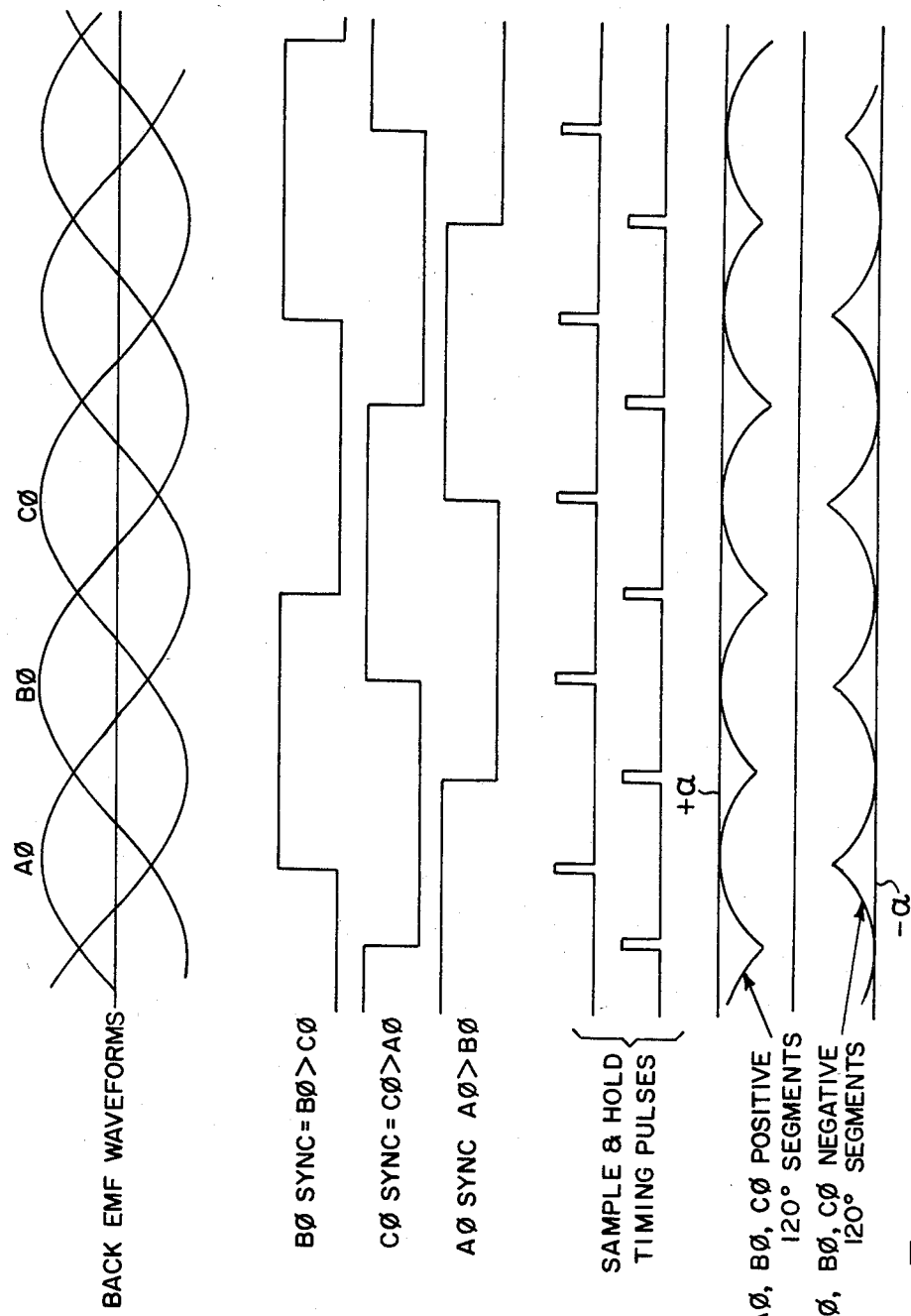
FIG. 3 is a waveform timing diagram useful in understanding the sync and α-control generator of FIG. 2.

Referring now specifically to FIG. 2, the outputs of the integrators are compared in pairs according to the above equations by comparators 31, 32 and 33 to produce the sync signals +AφSYNC, +BφSYNC and +CφSYNC. The inverse of these signals are also required for the inverter gate logic to be described with reference to FIG. 4. Inverters 34, 35 and 36 are provided for this purpose. Then inverters 37, 38 and 39 restore the uninverted sync signals. This arrangement is used in order to provide a low source impedance to the differentiators 40, 41 and 42. The output waveforms of these differentiators are negative pulses at the leading edges of the inverted sync waveforms, and positive pulses at the trailing edges of the inverted sync waveforms. The negative pulses are coupled by buffer diodes $D_1$, $D_2$ and $D_3$ to a pulse shaper 43 while the positive pulses are coupled by buffer diodes $D_4$, $D_5$ and $D_6$ to a pulse shaper 44. The pulse shaper 43 inverts the negative pulses so that they appear as shown in FIG. 2 for the leading edges of the AφSYNC, BφSYNC and CφSYNC waveforms. A similar train of sample-and-hold timing pulses will occur at the trailing edges (negative going transitions) of the sync waveform also shown in FIG. 2.

These two trains of timing pulses are applied to respective sample-and-hold circuits 45 and 46 which receive from "highest win" circuits 48 and 50 segments (120°) of positive and negative back EMF's symmetrical about their maxima, i.e., the respective positive and negative 120° segments that are the maxima of the three integrated back EMF waveforms. The samples are thus taken at the maxima of the positive and negative half cycles of each of the back EMF waveforms. Each sample-and-hold circuit stores a signal proportional to the last maximum from one sample to the next for use as a reference voltage in the inverter gate logic to control the inverter firing angle, $\pm \alpha$, i.e., for use as $\alpha$-control signals. The positive and negative reference levels are so adjusted through potentiometers $P_1$ and $P_2$ and non-inverting amplifiers 52 and 54 that the desired firing angle is maintained under dynamic conditions. The controller will thus be immune to fluctuations in the integrated back EMF as the motor speed changes.

Briefly, each sample-and-hold circuit is comprised of two operational amplifiers $A_1$ and $A_2$, and a field-effect transistor (FET) $Q_1$ as shown for the circuit 45. The input amplifier $A_1$ is designed to drive capacitive loads without instability. The output amplifier provides a high impedance unity gain follower to achieve extremely low voltage drop. The sample-and-hold pulse applied to the gate of the FET $Q_1$ turns it on to change the charge storage capacitor $C_s$ up or down to the level of the output of the "highest win" circuit connected to the input amplifier $A_1$. Once the transistor $Q_1$ is turned off, the charge is maintained at a very constant level until the next sample-and-hold pulse. This excellent storage capability is due to high input impedance of the voltage follower which functions as a precision voltage source isolator.

Figure 4:
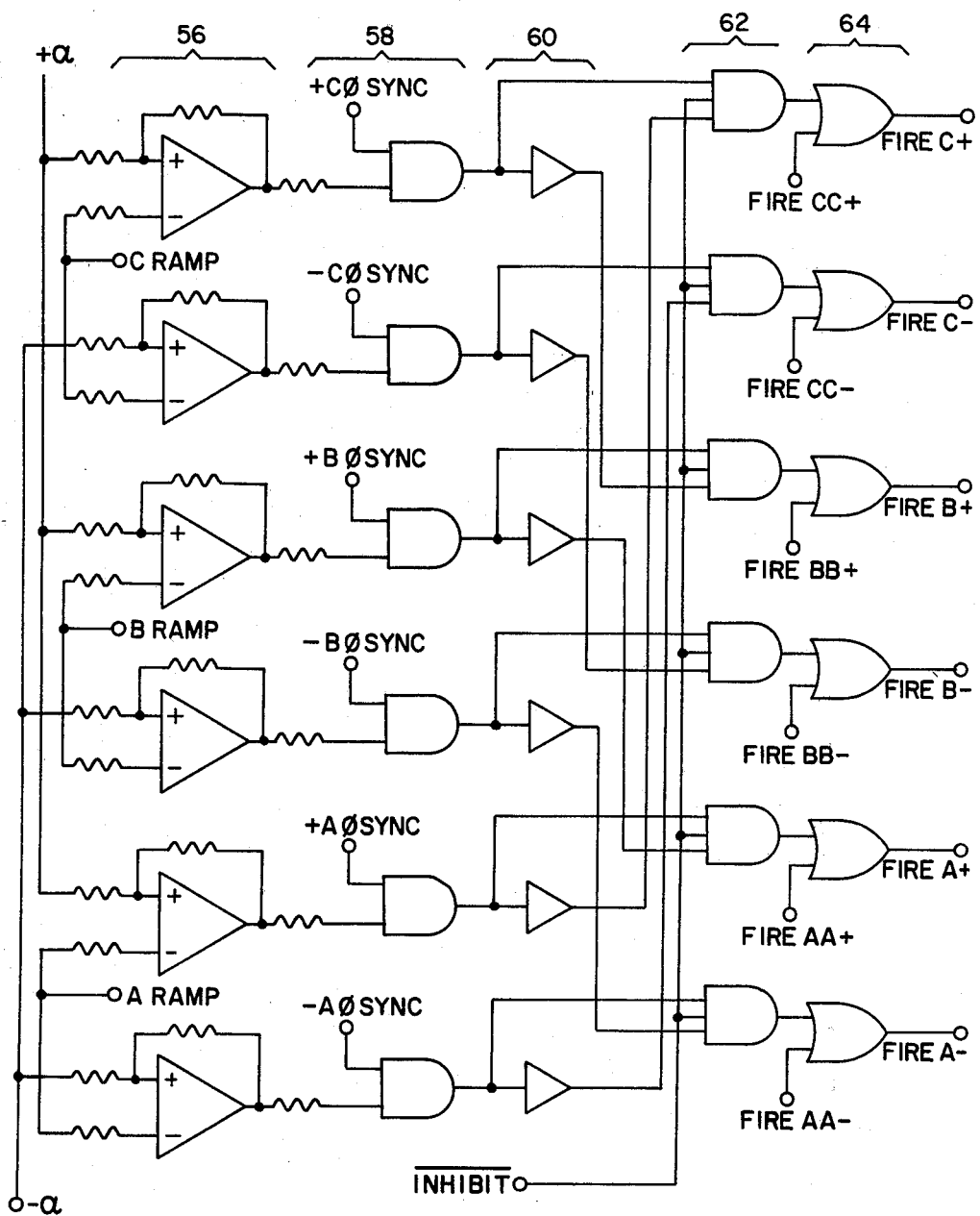
FIG. 4 is a logic diagram of the inverter gate logic in the system of FIG. 1.

The ramp signals used by the inverter gate of FIG. 4 are as follows:
 A RAMP = $C\phi$
 B RAMP = $A\phi$
 C RAMP = $B\phi$ Referring now to FIG. 4, a bank of six comparators 56 are utilized to compare the three ramp signals with both the positive and the negative $\alpha$-control signals according to the following equations:

COMP 1 = $A$ RAMP > $+\alpha$

COMP 2 = $B$ RAMP > $+\alpha$

COMP 3 = $C$ RAMP > $+\alpha$

COMP 4 = $A$ RAMP > $-\alpha$

COMP 5 = $B$ RAMP > $-\alpha$

COMP 6 = $C$ RAMP > $-\alpha$

The six signals COMP 1 through COMP 6 are combined with the sync signals in a bank of AND gates 58 to generate three positive and three negative phase firing control signals according to the following equations:

$A+ = +A\phi$SYNC·COMP 1

$B+ = +B\phi$SYNC·COMP 2

$C+ = +C\phi$SYNC·COMP 3

$A- = -A\phi$SYNC·COMP 4

$B- = -B\phi$SYNC·COMP 5

$C- = -C\phi$SYNC·COMP 6

Each of these firing control signals is inverted by one of a bank of inverters 60, and the inverted signal is applied to one of a bank of AND gates 62 to inhibit firing of a given device when, according to the logic equation, firing of that device is not required. This provides some immunity from noise. A third input to each of these AND gates is a control signal, $\overline{\text{INHIBIT}}$, which is a logical 1 during normal motor running conditions to enable the AND gates. A logical 0 disables these AND gates when the motor is shut down, or while the motor is being brought up to speed. During this starting period, the inverter is controlled by auxiliary signals applied to a bank of OR gates 64. These auxiliary signals are generated by a circuit (not shown) that utilizes rotor position feedback from the motor rather than back EMF as the basic source of information for generating the following control signals:
 FIRE AA+   FIRE AA−
 FIRE AB+   FIRE AB−
 FIRE AC+   FIRE AC−

Once the motor reaches a specified speed, such as 15% normal operating speed, the signal $\overline{\text{INHIBIT}}$ is again made high. The firing control signals out of the AND gates 62 are thus given by the following explicit equations:

FIRE $A+ = (A+\cdot \overline{B}+\cdot \overline{\text{INHIBIT}}) + $ FIRE $AA+$ FIRE $B+ = (B+\cdot \overline{C}+\cdot \overline{\text{INHIBIT}}) + $ FIRE $AB+$ FIRE $C+ = (C+\cdot \overline{A}+\cdot \overline{\text{INHIBIT}}) + $ FIRE $AC+$ FIRE $A- = (A-\cdot \overline{B}-\cdot \overline{\text{INHIBIT}}) + $ FIRE $AA-$ FIRE $B- = (B-\cdot \overline{C}-\cdot \overline{\text{INHIBIT}}) + $ FIRE $AB-$ FIRE $C- = (C-\cdot \overline{A}-\cdot \overline{\text{INHIBIT}}) + $ FIRE $AC-$ At this time, the terms Fire AA+, AB+, AC+, AA−, AB−, and AC− are all zero, having been inhibited by the INHIBIT signal at the source circuit. These outputs of OR gates 64 are used for firing control of the inverter, both during the positive and negative half cycle of the three-phase power to the motor from the inverter. In the event the gate drivers 28 (FIG. 1) are so implemented as to require the inverse of the firing control signals as well, inverters (not shown) may be added to provide the inversions.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. Apparatus for generating an adaptive reference voltage for use as a firing angle control signal in a system for control of a line-commutated inverter using information from integrated back EMF signals from a high speed multiphase permanent magnet motor comprising means of combining 120° segments of said integrated back EMF signals symmetrical about their maxima of one polarity into a composite wavform, and means for sampling said maxima of said composite waveform and holding each maximum until the next sampling, thereby generating a voltage to be used as a reference for comparison with said integrated back EMF signals for control of the firing angle of said inverter that is proportional to the amplitude of said integrated back EMF signals, whereby any change in amplitude of said integrated back EMF signals will not effect a change in the operating power factor of said motor and inverter.

2. Apparatus as defined in claim 1 including means for combining 120° segments into a composite waveform segments of said integrated back EMF signals symmetrical about their maxima of polarity opposite to said one polarity, and means for sampling said maximas of opposite polarity to generate a voltage reference of said opposite polarity in a way strictly analogous to generating said reference voltage of said one polarity.

3. Apparatus as defined in claim 1 or 2 wherein said motor is a 3-phase motor and said means for sampling and holding is comprised of means for comparing said integrated back EMF signals in pairs to produce for each integrated back EMF signal a square waveform having leading edges coincident with the maxima of the third integrated back EMF signal, and means for deriving from said leading edges of said square waveforms a train of pulses for timing the sampling function of said sample and hold means.

4. In a control system for a permanent-magnet motor driven by a 3-phase line-commutated inverter, and having integrators for integrating the back EMF of each phase of the motor for use in generating system control signals, the combination comprising means for combining out-of-phase sinusoidal waveforms produced by said integrators through circuits for combining the highest segment of each waveform symmetrical about their maxima of each polarity, and means for sampling and holding the successive maxima of each output waveform of said combining means to produce positive and negative firing angle control signals.

5. The combination defined by claim 4 wherein said means for sampling and holding the successive maxima of each waveform for producing each firing angle control signal includes means for attenuating the firing angle signal to a desired level for firing angle control.

6. The combination defined by claim 4 or 5 wherein said means for sampling and holding the successive maxima of each output waveform of said combining means is comprised of means for comparing said sinusoidal waveforms produced by said integrators in pairs of produce for each sinusoidal waveform a square waveform having a leading edge coincident with the maxima of the third sinusoidal waveform of positive polarity and a trailing edge coincident with the maxima of the third sinusoidal waveform of negative polarity, and means for deriving from said leading and trailing edges of said square waveforms two trains of pulses for timing said means for sampling of the successive maxima of each output waveform of said combining means to produce said positive and negative firing angle control signals.

* * * * *